(12) United States Patent
Al-Dahhan

(10) Patent No.: US 7,416,175 B2
(45) Date of Patent: Aug. 26, 2008

(54) SPRING SEAT ASSEMBLY

(75) Inventor: Sadiq Al-Dahhan, Dearborn, MI (US)

(73) Assignee: BASF Corporation, Florham Park, NJ (US)

( * ) Notice: Subject to any disclaimer, the term of this patent is extended or adjusted under 35 U.S.C. 154(b) by 47 days.

(21) Appl. No.: 11/255,198

(22) Filed: Oct. 20, 2005

(65) Prior Publication Data

US 2006/0082037 A1 Apr. 20, 2006

Related U.S. Application Data

(60) Provisional application No. 60/620,590, filed on Oct. 20, 2004.

(51) Int. Cl.
*F16F 5/00* (2006.01)

(52) U.S. Cl. .................. 267/220; 267/140; 267/152; 267/153; 267/179; 267/286; 267/292; 267/140.11

(58) Field of Classification Search ............... 267/220, 267/221, 140.11, 152, 153, 179, 286, 292, 267/140

See application file for complete search history.

(56) References Cited

U.S. PATENT DOCUMENTS

| | | | |
|---|---|---|---|
| 2,100,464 A | 11/1937 | Almen et al. | |
| 2,356,310 A | 8/1944 | Gass | |
| 4,462,608 A | 7/1984 | Lederman | |
| 4,690,428 A | 9/1987 | Fluegge | |
| 4,804,169 A | 2/1989 | Hassan | |
| 4,805,886 A | 2/1989 | Hassan | |
| 4,810,003 A | 3/1989 | Pinch et al. | |
| 5,000,429 A | 3/1991 | Wittmar et al. | |
| 5,149,069 A | 9/1992 | Hein | |
| 5,158,269 A | 10/1992 | Hein et al. | |
| 5,238,233 A | 8/1993 | Hein | |
| 5,246,215 A | 9/1993 | Takamura et al. | |
| 5,421,565 A | 6/1995 | Harkrader et al. | |
| 5,467,970 A | 11/1995 | Ratu et al. | |
| 5,467,971 A | 11/1995 | Hurtubise et al. | |
| 5,470,049 A | 11/1995 | Wohler et al. | |
| 5,664,892 A | 9/1997 | Kellam | |
| 5,676,355 A * | 10/1997 | Hayashi et al. | 267/221 |
| 5,788,262 A | 8/1998 | Dazy et al. | |
| 6,007,061 A | 12/1999 | Kammel et al. | |
| 6,079,700 A | 6/2000 | Solomond et al. | |
| 6,149,171 A | 11/2000 | Bono et al. | |

(Continued)

FOREIGN PATENT DOCUMENTS

EP 0 778 166 B1 11/2001

*Primary Examiner*—Robert A. Siconolfi
*Assistant Examiner*—Mahbubur Rashid

(57) ABSTRACT

A spring seat assembly for a suspension system of a vehicle utilizing a coil spring. The spring seat assembly includes a first spring seat retainer having a central axis. The first spring seat retainer includes a flange and a pocket portion extending from the flange toward a distal end. The flange includes a first side and a second side extending radially from the central axis in a spaced and parallel relationship. The flange includes a plurality of ribs that extend radially relative to the central axis. The ribs project axially from the first side and the second side of the flange and are spaced angularly from one another. The ribs on the first side are angularly offset from the ribs on the second side for dampening vibration and absorbing noise upon a compression of the coil spring.

19 Claims, 3 Drawing Sheets

U.S. PATENT DOCUMENTS

| | | |
|---|---|---|
| 6,155,544 A | 12/2000 | Solomond et al. |
| 6,182,953 B1 | 2/2001 | Smith et al. |
| 6,186,486 B1 | 2/2001 | Gutman et al. |
| 6,254,072 B1 | 7/2001 | Bono et al. |
| 6,296,237 B1 | 10/2001 | Nagai |
| 6,398,201 B1 | 6/2002 | Solomond et al. |
| 6,412,798 B2 | 7/2002 | De Fontenay et al. |
| 6,457,704 B1 | 10/2002 | Van Eerden et al. |
| 6,485,008 B1 | 11/2002 | Griffin |
| 6,572,087 B2 * | 6/2003 | Schleinitz et al. ........ 267/140.4 |
| 6,733,023 B2 | 5/2004 | Remmert et al. |
| 6,736,381 B2 | 5/2004 | Chesne |
| 6,857,626 B2 * | 2/2005 | Burlage et al. .............. 267/220 |
| 2001/0015537 A1 | 8/2001 | De Fontenay et al. |
| 2003/0132561 A1 | 7/2003 | Burlage et al. |
| 2004/0075204 A1 | 4/2004 | Heidemann et al. |

* cited by examiner

SPRING SEAT ASSEMBLY

CROSS REFERENCE TO RELATED APPLICATION

This application claims the benefit of U.S. provisional patent application Ser. No. 60/620,590, which was filed on Oct. 20, 2004.

BACKGROUND OF THE INVENTION

1. Field of the Invention

A spring seat assembly for a suspension system of a vehicle of the type using a coil spring.

2. Description of the Prior Art

Vehicle suspension systems of the prior art typically include spring seat assemblies each having a pair of opposing spring seat retainers with a coil spring disposed therebetween. Spring seat retainers of a variety of configurations are well known in the art. An example of a configuration of a spring seat retainer is shown in European Publication No. 0 778 166 B1. The spring seat retainer disclosed in this European Publication is formed of a polymeric material and includes a flange extending radially from a central axis. A pocket portion extends from the flange to a distal end and supports a coil spring encircling the pocket portion. A jounce bumper is disposed within a cavity of the pocket portion and extends from the distal end. A spring isolator, which is a pad having a donut shaped configuration, abuts the flange of the spring seat retainer. The spring isolator is designed to absorb noise upon compression of the coil spring. Spring isolator pads of this type are useful, but can be cumbersome to install and have operational limitations.

The prior art has also contemplated an isolator pad having a corrugated configuration to improve performance. U.S. Pat. No. 6,155,544 to Solomond et al. discloses a spring seat retainer having a flange extending radially from a central axis. A spring isolator, which is again a pad having a donut shaped configuration, abuts the flange of the spring seat retainer. The spring isolator is corrugated for absorbing noise upon a compression of the coil spring.

Although the prior art has developed improved designs, there remains a need to develop a spring seat retainer that incorporates the advantages of the prior art isolator pads while avoiding the potential drawbacks of these pads.

SUMMARY OF THE INVENTION AND ADVANTAGES

The present invention provides a spring seat assembly for use in a suspension system of a vehicle utilizing a coil spring. The spring seat assembly includes a first spring seat retainer having a central axis and a flange. The flange has a first side and a second side extending radially from the central axis in a spaced and parallel relationship. A pocket portion extends axially from the flange to a distal end and defines a cavity between the distal end and the flange. A jounce bumper is mounted within the cavity and extends from the distal end. A plurality of ribs extends radially relative to the central axis, are spaced angularly from one another, and projecting axially from the first side and the second side of the flange.

The present invention therefore provides for a spring seat assembly having an integrated absorption device that not only dampens vibration and absorbs noise but is also cost effective and reduces the number of parts.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Figure 1:
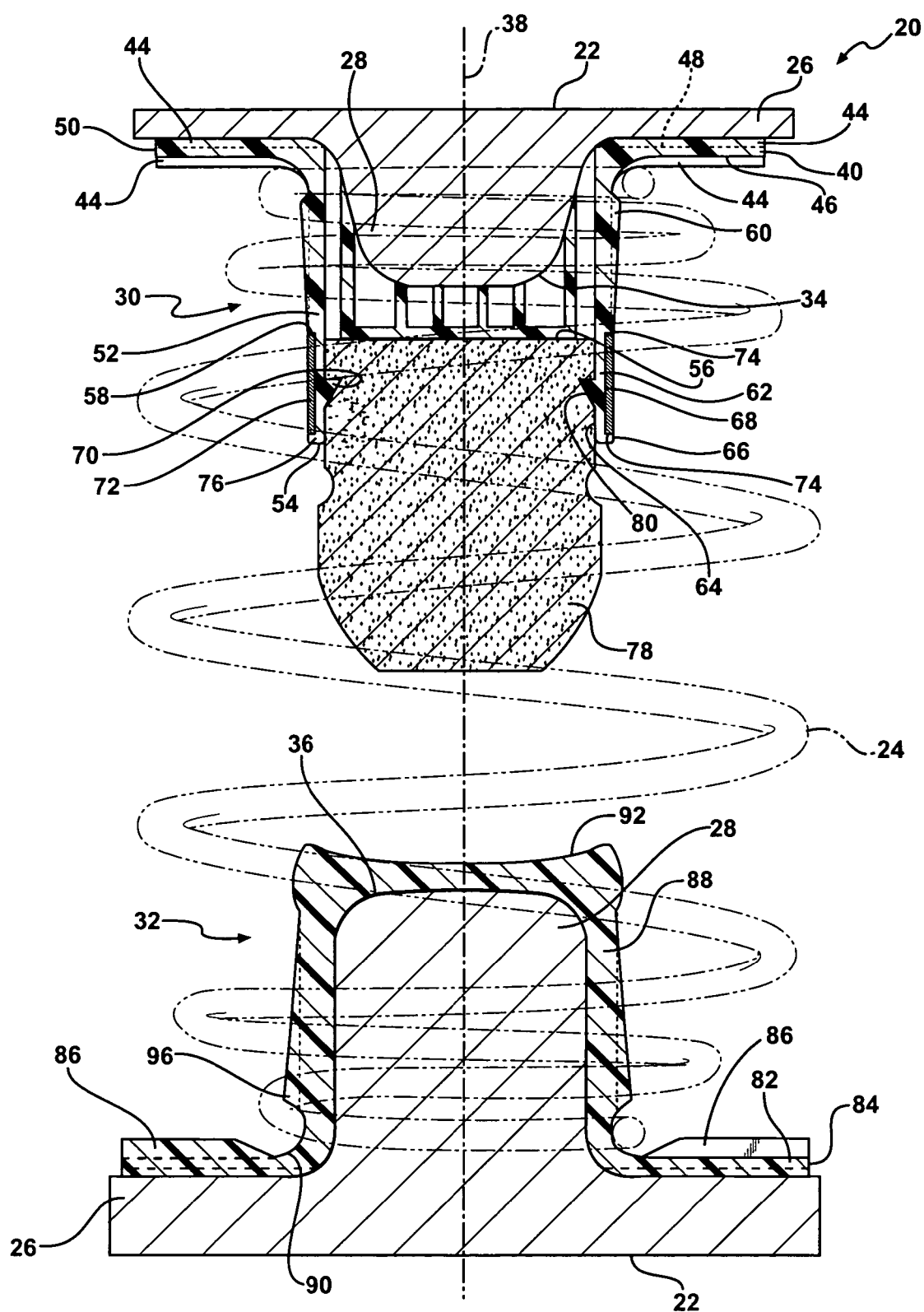
FIG. 1 is a cross-sectional view of a spring seat assembly showing a first spring seat retainer and a second spring seat retainer at opposite ends of a coil spring shown in phantom.

Referring to the Figures, wherein like numerals indicate corresponding parts throughout the several views, a spring seat assembly 20 is generally shown in FIG. 1. The spring seat assembly 20 includes a first spring seat retainer 30 and a second spring seat retainer 32. The spring seat assembly 20 is part of a suspension system for use in a vehicle (not shown).

The suspension system further includes a plurality of spring seats 22 and a coil spring 24 shown in phantom. Each of the spring seats 22 include a planar portion 26 and a projection 28 extending toward each other from corresponding planar portions 26. The spring seats 22 are preferably made of steel and are mounted to corresponding structures of the vehicle.

The first spring seat retainer 30 defines an opening 34 and the second spring seat retainer 32 defines a void 36 for mating with the corresponding projections 28 of the spring seats 22. In particular, the first and second spring seat retainers 30, 32 are mounted to associated spring seats 22 having the coil spring 24 disposed therebetween. One skilled in the art will appreciate that the first and second spring seat retainers 30, 32 may be of any suitable configuration to mount to alternative spring seats 22 and/or alternative suspension systems.

Figure 2:
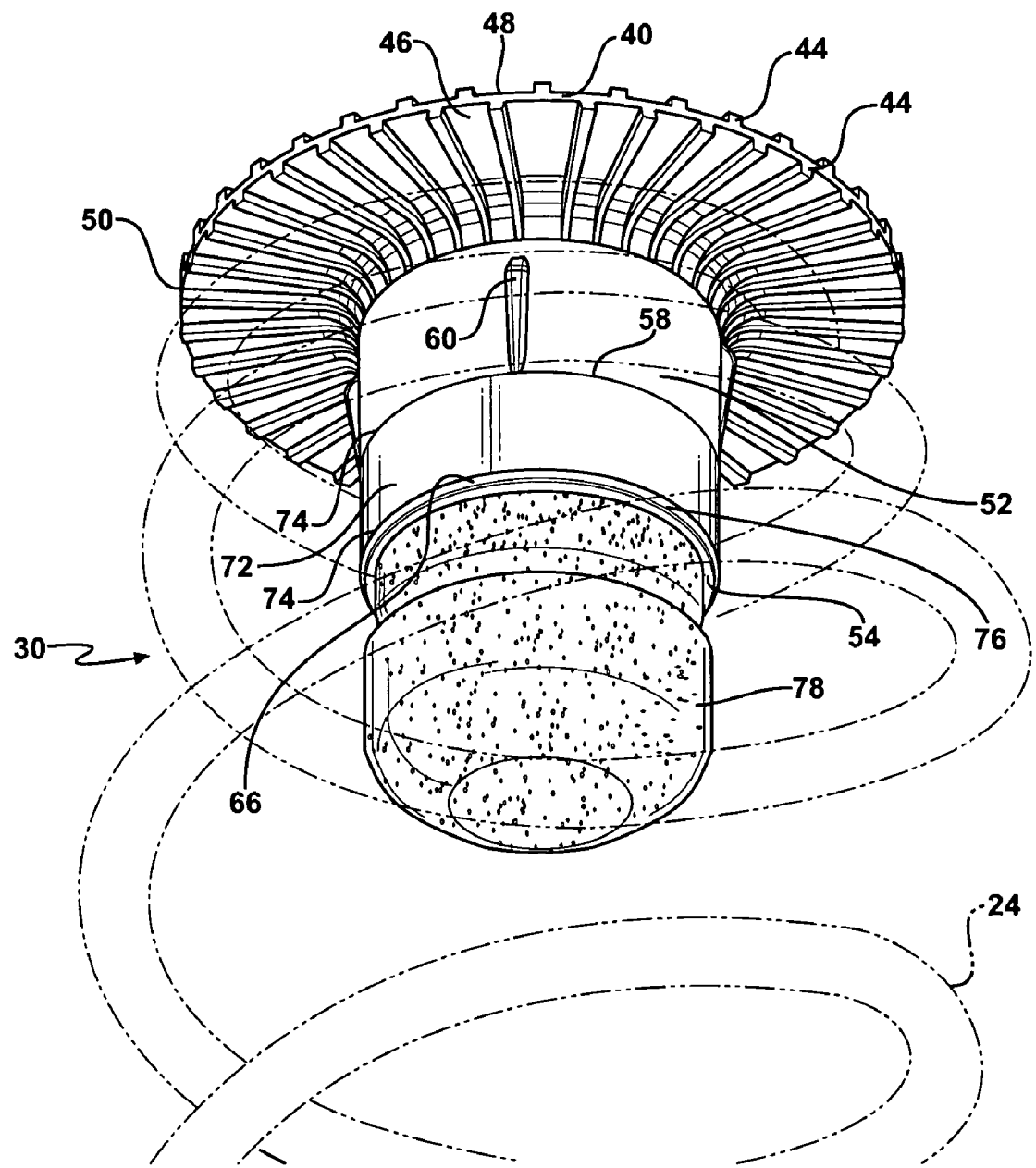
FIG. 2 is a perspective view of the first spring seat retainer and the coil spring shown in phantom.
Figure 3:
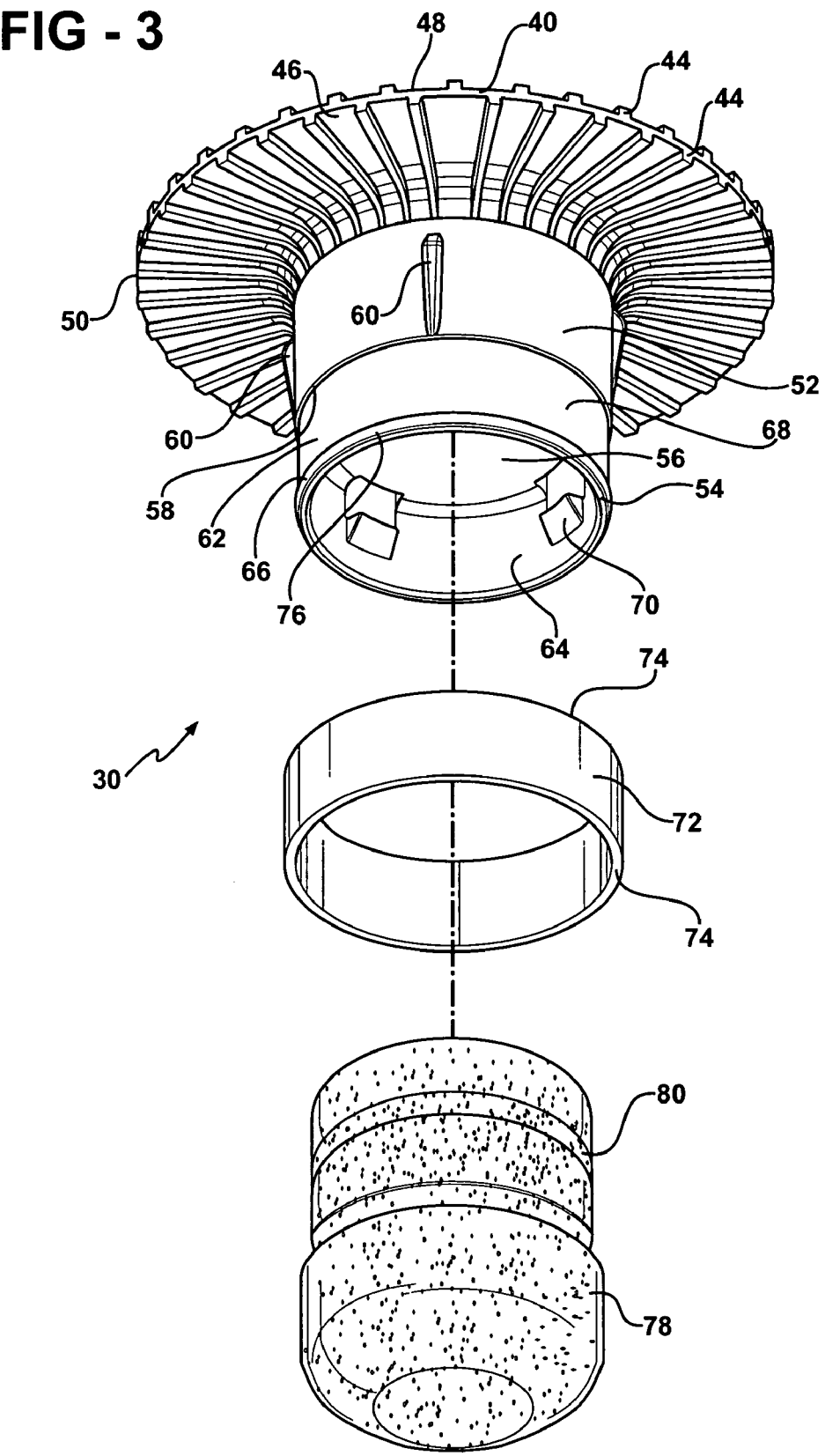
FIG. 3 is an exploded view of the first spring seat retainer.

Referring also to FIGS. 2 and 3, the first spring seat retainer 30 includes a central axis 38, a flange 40, and a pocket portion 52. The flange 40 includes a first side 46 and a second side 48 extending radially from the central axis 38 in a spaced and parallel relationship. The flange 40 also includes a plurality of ribs 44 that extend radially relative to the central axis 38. The ribs 44 project axially from the first and second sides 46, 48 of the flange 40 and are spaced angularly from one another. The ribs 44 on the first side 46 are angularly offset from the ribs 44 on the second side 48 for dampening vibration and absorbing noise upon a compression of the coil spring 24. The flange 40 further includes a peripheral edge 50, wherein the ribs 44 on the first and second sides 46, 48 of the flange 40 extend radially inwardly from the peripheral edge 50. Each of the ribs 44 on the first side 46 decrease in axial thickness to taper from the peripheral edge 50 toward the pocket portion 52. Similarly, each of the ribs 44 on the second side 48 decrease in axial thickness to taper from the peripheral edge 50 toward the opening 34. It should be appreciated that the ribs 44 may be of any suitable design or configuration so long as the flange 40 can adequately dampen vibration and absorb noise from the coil spring 24.

The pocket portion 52 includes a distal end 54 with the pocket portion 52 extending axially from the flange 40 to the distal end 54 for supporting the coil spring 24 encircling the pocket portion 52. Preferably, the flange 40, the ribs 44, and all features of the pocket portion 52 are formed of a one-piece homogeneous material. Even more preferably, the first spring seat retainer 30 is formed of a polymeric material or plastic material such as nylon, isoprene, polypropylene, or polyurethane. In the most preferred embodiment, the first spring seat retainer 30 is formed of a one-piece integrated thermoplastic polyurethane (TPU) material.

The pocket portion 52 also includes a shoulder 58 and a plurality of fins 60. The plurality of fins 60 are spaced circumferentially about an exterior of the pocket portion 52 and extend along the central axis 38 to the shoulder 58 for engaging and retaining the coil spring 24. The fins 60 extend axially from a predetermined distance spaced from the flange 40 to the shoulder 58. The fins 60 are preferably integral with the pocket portion 52.

The pocket portion 52 further includes a distal rim 62, wherein the distal rim 62 includes an inner surface 64 and an outer surface 66 in a spaced and parallel relationship. The outer surface 66 of the rim 62 defines a recess 68 extending axially from the shoulder 58 to the distal end 54. The pocket portion 52 also defines a cavity 56 between the distal end 54 and the flange 40. The inner surface 64 of the rim 62 includes a plurality of tabs 70 that project into the cavity 56. Preferably, the tabs 70 are integral with the inner surface 64 of the rim 62.

A restrictor 72 is disposed completely about the rim 62 to prevent the rim 62 from bulging or deforming. The restrictor 72 presents spaced edges 74 and is disposed in the recess 68 with one of the edges 74 abutting the shoulder 58. The distal end 54 of the rim 62 includes a protrusion 76 that extends over one of the edges 74 of the restrictor 72 opposite the shoulder 58 to retain the restrictor 72 in the recess 68. The restrictor 72 is preferably made of a metal, such as steel.

A jounce bumper 78 is disposed within the cavity 56 of the pocket portion 52 and extends from the distal end 54. Preferably, the jounce bumper 78 is formed of a polymeric or elastomeric material, such as micro-cellular polyurethane (MPU). The jounce bumper 78 defines an annular groove 80, wherein the tabs 70 of the rim 62 engage the groove 80 for retaining the jounce bumper 78 in the cavity 56.

Referring back to FIG. 1, the second spring seat retainer 32 has a similar configuration as the first spring seat retainer 30. The second spring seat retainer 32 includes the central axis 38, a base portion 82, and a neck portion 88. The base portion 82 includes an outer perimeter 84, wherein the base portion 82 extends radially from the central axis 38 toward the outer perimeter 84. The base portion 82 further includes a plurality of ridges 86 spaced angularly from one another. The ridges 86 extend radially relative to the central axis 38 and project axially toward the outer perimeter 84 of the base portion 82. The ridges 86 are spaced a predetermined distance from the neck portion 88 to define a depression 90 for engaging and retaining the coil spring 24. Preferably, the ridges 86 are integral with the base portion 82. Although not numbered, the second spring seat retainer 32 may also include a similar rib configuration as discussed above for dampening vibration and absorbing noise. In particular, the base portion 82 of the second spring seat retainer 32 also has a first side and a second side extending radially from the central axis 38 of the second spring seat retainer 32 in a spaced and parallel relationship. The ribs would extend radially relative to the central axis 38 of the second spring seat retainer 32, be spaced angularly from one another, and would project axially from the first side and the second side of the base portion 82.

The neck portion 88 extends axially from the base portion 82 for supporting the coil spring 24 encircling the neck portion 88. The neck portion 88 includes a cap 92 at a top thereof to define a jounce contact surface for engaging with the jounce bumper 78. A plurality of strips 96 are spaced circumferentially about an exterior of the neck portion 88 and extend along the central axis 38. The strips 96 are spaced a predetermined distance from the base portion 82 and extend toward a predetermined distance spaced from the jounce contact surface for engaging and retaining the coil spring 24. Preferably, the cap 92 and the strips 96 are integral with the neck portion 88.

The base portion 82 and the neck portion 88 are preferably formed of a one-piece homogeneous material. Even more preferably, the second spring seat retainer 32 is similarly formed of a polymeric material or plastic material such as nylon, isoprene, polypropylene, or polyurethane. In the most preferred embodiment, the second spring seat retainer 32 is similarly formed of a one-piece integrated TPU material.

The invention has been described in an illustrative manner, and it is to be understood that the terminology which has been used is intended to be in the nature of words of description rather than of limitation. Obviously, many modifications and variations of the present invention are possible in light of the above teachings. It is, therefore, to be understood that within the scope of the appended claims, the invention may be practiced otherwise than is specifically described.

What is claimed is:

1. A spring seat assembly for a suspension system of a vehicle utilizing a coil spring, said assembly comprising;
    a first spring seat retainer having a central axis and a flange, said flange having a first side and a second side extending radially from said central axis to a peripheral edge in a spaced and parallel relationship relative to each other,
    a pocket portion extending axially from said flange to a distal end and defining a cavity between said distal end and said flange,
    a jounce bumper mounted within said cavity and extending from said distal end, and
    a plurality of ribs extending radially relative to said central axis and spaced angularly from one another with a first portion of said ribs projecting axially from said first side of said flange toward said pocket portion and a second portion of said ribs projecting axially from said second side of said flange away from said pocket portion with said first portion of said ribs being offset from said second portion of said ribs along said peripheral edge such that each rib of said first portion of said ribs on said first side is disposed between an adjacent pair of ribs of said second portion of said ribs on said second side with said ribs maintaining said axial projection during operation of the suspension system.

2. An assembly as set forth in claim 1 wherein said flange and said ribs and said pocket portion are formed of a homogeneous material.

3. An assembly as set forth in claim 1 wherein said flange and said ribs and said pocket portion are formed of a polymeric material.

4. An assembly as set forth in claim 3 wherein said polymeric material comprises a thermoplastic polyurethane material.

5. An assembly as set forth in claim 1 wherein said flange includes said peripheral edge and said ribs on said first side of said flange extend radially inwardly from said peripheral edge, each of said ribs on said first side decrease in axial thickness to taper from said peripheral edge toward said pocket portion.

6. An assembly as set forth in claim 5 wherein said second side of said flange defines an opening between said flange and said distal end of said pocket portion.

7. An assembly as set forth in claim 6 wherein said ribs on said second side of said flange extend radially inwardly from said peripheral edge of said flange, each of said ribs on said second side decrease in axial thickness to taper from said peripheral edge toward said opening.

8. An assembly as set forth in claim 1 wherein said pocket portion defines a distal rim.

9. An assembly as set forth in claim 8 including a restrictor disposed completely about said rim.

10. An assembly as set forth in claim 9 wherein said restrictor is formed of a metallic material.

11. An assembly as set forth in claim 9 wherein said rim includes an inner surface and an outer surface.

12. An assembly as set forth in claim 11 wherein said pocket portion includes a shoulder.

13. An assembly as set forth in claim 12 wherein said outer surface of said rim defines a recess extending axially from said shoulder to said distal end.

14. An assembly as set forth in claim 13 wherein said restrictor presents spaced edges and is disposed in said recess with one of said edges abutting said shoulder.

15. An assembly as set forth in claim 14 wherein said distal end of said rim includes a protrusion extending over one of said edges of said restrictor opposite said shoulder to retain said restrictor in said recess.

16. An assembly as set forth in claim 1 wherein said pocket portion includes a plurality of fins spaced thereabout and extending along said central axis to said shoulder.

17. An assembly as set forth in claim 1 wherein said second side of said flange defines an opening between said flange and said distal end.

18. An assembly as set forth in claim 17 wherein said ribs on said second side of said flange extend radially inwardly from said peripheral edge of said flange, each of said ribs on said second side decrease in axial thickness to taper from said peripheral edge toward said opening.

19. A suspension system for a vehicle, said system comprising;
 a first spring seat retainer having a central axis and a flange,
 a second spring seat retainer having a central axis and a base portion,
 a coil spring disposed between said first spring seat retainer and said second spring seat retainer,
 a pair of spring seats supporting said first spring seat retainer and said second spring seat retainer thereon,
 said flange of said first spring seat retainer having a first side and a second side extending radially from said central axis of said first spring seat retainer to a peripheral edge in a spaced and parallel relationship relative to each other with said second side facing one of said spring seats,
 said base portion of said second spring seat retainer having a first side and a second side extending radially from said central axis of said second spring seat retainer to an outer perimeter in a spaced and parallel relationship relative to each other with said second side facing said other spring seat,
 a pocket portion extending axially from said flange to a distal end and defining a cavity between said distal end and said flange,
 a jounce bumper mounted within said cavity and extending from said distal end, and
 a plurality of ribs extending radially relative to at least one of said central axes and spaced angularly from one another and projecting axially from said first side and said second side of at least one of said flange and said base portion with said ribs of said first side being offset from said ribs of said second side along one of said peripheral edge and said outer perimeter such that each of said ribs on said first side is disposed between an adjacent pair of ribs on said second side with said ribs of said second side of at least one of said flange and said base portion abutting one of said spring seats for spacing at least one of said flange and said base from one of said spring seats.

* * * * *